United States Patent
Kluczynski et al.

(10) Patent No.: US 8,619,364 B2
(45) Date of Patent: Dec. 31, 2013

(54) APPARATUS FOR REDUCING FRINGE INTERFERENCE OF LIGHT CREATED IN AN OPTICAL SYSTEM OF A LASER SPECTROSCOPY SYSTEM

(75) Inventors: Pawel Kluczynski, Västra Frölunda (SE); Rikard Larking, Floda (SE); Tomas E. Lock, Mölndal (SE)

(73) Assignee: Siemens Aktiengesellschaft, Munich (DE)

( * ) Notice: Subject to any disclaimer, the term of this patent is extended or adjusted under 35 U.S.C. 154(b) by 442 days.

(21) Appl. No.: 12/970,436

(22) Filed: Dec. 16, 2010

(65) Prior Publication Data

US 2011/0228371 A1 Sep. 22, 2011

(30) Foreign Application Priority Data

Dec. 17, 2009 (EP) ..................................... 09179738

(51) Int. Cl.
*G02B 27/00* (2006.01)
(52) U.S. Cl.
USPC .............................. 359/578; 359/577; 356/451
(58) Field of Classification Search
None
See application file for complete search history.

(56) References Cited

U.S. PATENT DOCUMENTS

| 4,684,258 | A | 8/1987 | Webster |
| 4,934,816 | A | 6/1990 | Silver et al. |
| 5,636,035 | A | 6/1997 | Sun |
| 5,889,208 | A * | 3/1999 | Nose .......................... 73/504.16 |
| 6,188,504 | B1 * | 2/2001 | Murakami et al. ......... 359/224.1 |
| 6,641,043 | B1 * | 11/2003 | Plesko ..................... 235/462.33 |
| 7,800,764 | B2 | 9/2010 | Kluczynski |

FOREIGN PATENT DOCUMENTS

EP 1927831 6/2008

* cited by examiner

*Primary Examiner* — Arnel C Lavarias
(74) *Attorney, Agent, or Firm* — Cozen O'Connor

(57) ABSTRACT

An apparatus for reducing fringe interference of light created in the optical system of a laser spectroscopy system comprising an electromagnetic actuator for generating, along a laser path, physical translational vibration of an optical element of the optical system and a control device for controlling the amplitude and frequency of said vibration. The optical element is arranged on a cantilever body which is, at one end, attached to a base by a flexural pivot and, at the other free end, coupled to the electromagnetic actuator, and the control device includes a controller that controls the amplitude of the vibration and a vibration sensor attached to the cantilever body and providing the actual vibration value to the controller to improve fringe interference reduction, especially with longer wavelengths.

4 Claims, 2 Drawing Sheets ured for actuator power consumption.

APPARATUS FOR REDUCING FRINGE INTERFERENCE OF LIGHT CREATED IN AN OPTICAL SYSTEM OF A LASER SPECTROSCOPY SYSTEM

BACKGROUND OF THE INVENTION

1. Field of the Invention

The invention relates to noise reduction and, more particularly, to an apparatus for reducing fringe interference of light created in an optical system of a laser spectroscopy system, where the apparatus comprises an electromagnetic actuator for generating, along the laser path, physical translational vibration of an optical element of the optical system and a control device for controlling the amplitude and frequency of the vibration.

2. Description of the Related Art

The dominating source of background noise in laser absorption spectrometry is from the creation of spurious standing optical waves in the optical system, i.e., etalon effects. Etalon effects are created by multiple reflections from various optical surfaces, such as mirrors or windows. The etalon effects manifest themselves in a detected signal as interference fringes that can easily obscure an analytical signal from a sample. Etalon effects are extremely difficult to eliminate, even if a high quality anti-reflection coating is used because the interference pattern is deterministic rather than random. Consequently, normal averaging of the laser scans fails to reduce the interferences. One well-known and effective way to reduce the fringes is to vary the path length of the stray components by vibrating the position of the optical component that contributes to the creation of an etalon signal.

U.S. Pat. No. 4,684,258 to Webster describes the insertion of a vibrating Brewster plate between two etalon creating surfaces and thus periodically changing the optical path length of the etalon. U.S. Pat. No. 4,934,816 to Silver, et al. discloses a similar mechanical approach, where etalon effects in a multi-pass cell are reduced by the introduction of a vibrating mirror. In both cases, the vibration frequency is asynchronous with the laser modulation frequency so that the fringe pattern due to etalon effects will be averaged out. Moreover, the Webster and Silver, et al. approaches both use a triangular waveform to drive the plate and mirror into oscillation, respectively.

A triangular waveform provides a greater level of etalon fringe reduction in comparison to square or sinus waveforms, because the time spent by the vibrating element at the turning points is minimized. Unfortunately, this approach has two drawbacks. Firstly, generation of a triangular waveform requires a highly linear electromechanical transducer and imposes high requirements on the electromechanical setup. Secondly, in practice, the vibration amplitude of the optical element must be more than 30 Free Spectral Ranges (FSRs) or 15 laser wavelengths to obtain a sufficient reduction of the etalon effect. This becomes especially impractical when longer laser wavelengths are used thus imposing higher power consumption and placing higher demands on the mechanical components. Existing commercial instruments, which typically use vibration transition harmonic wavelengths in the range of 0.76 to 1.5 $\mu$m, would then require vibration amplitudes from around 10 to 25 $\mu$m. However, optimal laser wavelengths for laser spectroscopy are between 3 to 20 $\mu$m, where strong absorption signals exist due to molecular vibration transitions. As a result, larger vibrations amplitudes for reducing the etalon interference signal efficiently would be required. Consequently, the vibration amplitude is increased from around 10 to 25 $\mu$m to around 45 to 300 $\mu$m. As standard piezo-transducers have limited length expansion capabilities, their use will become virtually impossible for the lasers with longer wavelengths.

EP 1 927 831 discloses varying the optical path length of the passive optical cavity with a Gaussian (normal) distribution, where the standard deviation is at least one-quarter of the wavelength of the light. Thus, compared to triangular modulation, which requires vibrational amplitudes over several laser wavelengths, an efficient etalon averaging is already obtained at amplitudes following a Gaussian distribution with a standard deviation slightly above one-quarter wavelength. Another advantage is that, due to the character of noise modulation, there is no need to amplitude and/or phase control the modulating waveform, thus allowing a simplified hardware design. On the other hand, the random (noise) modulation contains high frequency components that exert higher acceleration forces on the moving mechanics.

All the known approaches use an open loop piezoelectric actuator for vibrationally moving the optical component that contributes to the creation of etalon signals.

SUMMARY OF THE INVENTION

It is therefore an object of the invention to provide an improved apparatus for reducing fringe interference of light created in an optical system of a laser spectroscopy system, especially with longer wavelengths, and which is configured to vibrate a position of the optical component that contributes to creation of the etalon effect with a triangular waveform.

This and other objects and advantages are achieved in accordance with the invention by an apparatus in which the actuator is an electromagnetic type actuator, an optical element is arranged on a cantilever body which, at one end, is attached to a base by a flexural pivot and, at the other free end, is coupled to the electromagnetic actuator, and includes a control device having a controller that controls the amplitude of the vibration and a vibration sensor attached to the cantilever body that provides the actual vibration value to the controller.

In accordance with the invention the apparatus advantageously provides a large vibrational amplitude, a well controlled motion waveform and a robust low cost implementation.

The cantilever body and its flexural mounting create the large vibrational amplitude, where the mechanical design can be tailored to yield any needed amplitude. In an embodiment, the flexural pivot comprises several different materials, where copper-beryllium materials are particularly suitable due to their excellent fatigue properties and their lower modulus (compared to steel materials).

The mechanical system will by itself have two undesirable properties, a sinusoidal motion profile and a fixed resonance frequency. These undesirable properties are eliminated by adding a motion control system to the mechanical flexure, where the control device includes the controller, which controls the amplitude of the vibration and a vibration sensor attached to the cantilever body and which provides the actual vibration value to the controller. The addition of a well designed control system increases the motion bandwidth from a few percent to a bandwidth large enough to reproduce a triangle wave with reasonable fidelity.

The cantilever body moment of inertia should be minimized while maintaining the higher order resonance frequencies at a high enough level so that they do not limit the performance of the control system. As a result, the allowable higher order resonance frequencies is generally set to 3 to 10 times above the upper bandwidth of the control system. Consequently, the combination of a mechanical flexure and a well-designed control system provides large, well controlled motion profiles with sufficient bandwidth.

The electromechanical performance (i.e., motion fidelity in proportion to power consumption) can be advantageously optimized by arranging the optical element at a position between the ends of the cantilever body where the moment of inertia of the optical component around the pivot is at least substantially equal to that of the cantilever body.

Preferably, the electromagnetic actuator comprises a moving magnet having a magnet attached to the cantilever body and a drive coil attached to a support block. This simplifies the configuration, increases reliability and decreases associated manufacturing costs. Alternatively, the magnet may be typically of a rare earth type, i.e., either Neodymium-Boron-Iron or Samarium-Cobalt types, as these have the needed magnetic energy to achieve a compact design.

In a very low cost embodiment of the invention, the vibration sensor comprises a sense coil interacting with the magnet of the electromagnetic actuator. Thus, the drive and sense coils and the magnet are combined into one unit, where both coils may be wound on the same bobbin. This simple low cost embodiment, however, will have transformer cross-coupling between the drive and sense coil which somewhat limits the performance of the control system. The cross-coupling can largely be cancelled out or eliminated electronically. The presently contemplated embodiment of the invention would typically be used for low cost systems with lower motion frequencies, size restraints and somewhat lower triangle fidelity.

For higher motion frequencies, the actuator and sensor are preferably separated and identical in construction. Consequently, the vibration sensor comprises a moving magnet having a further magnet attached to the cantilever body and a sense coil attached to the support block or another support block.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be now described, by way of example, with reference to the accompanying drawings, in which.

DETAILED DESCRIPTION OF THE PRESENTLY PREFERRED EMBODIMENTS

Figure 1:
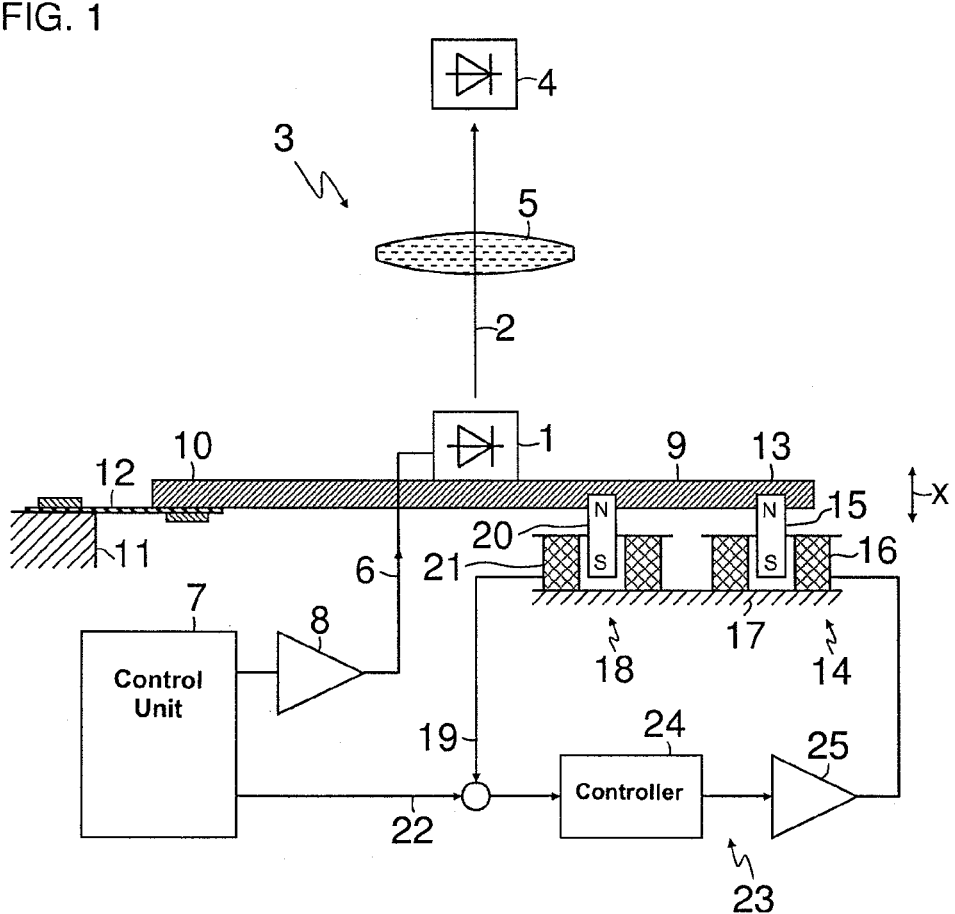
FIG. 1 is a schematic block diagram of an embodiment of an apparatus for reducing fringe interference of light created in the optical system of a laser spectrometer.

FIG. 1 shows an exemplary schematic block diagram of the apparatus in accordance with an embodiment of the invention. In particular, FIG. 1 depicts a laser spectrometer including a frequency tunable laser 1 for generating a laser beam 2 which passes through an optical system 3 onto an optical detector 4. The optical system 3 comprises, in addition to the active components 1 and 4, a sample cell (not shown) containing a trace gas species in a gas mixture and further optical elements, such as a collimating lens 5. The laser 1 is modulated with a triangular or sawtooth modulation signal 6 to sweep the laser wavelength across specific absorption lines of the trace gas to be determined. The modulation signal 6 is generated by a control unit 7 and applied through a laser driver 8 to the laser 1. The signal received at the optical detector 4 is demodulated to obtain an absorption induced signal.

Partially reflecting optical surfaces of the sample cell and other optical elements of the optical system 3, such as windows or lenses, e.g., 5, form a passive optical cavity (etalon). This etalon may create an etalon effect when light reflected or scattered by the optical surfaces reaches the detector 4 and interferes with the primary beam 2. When the laser beam 2 propagates through the etalon, multiple reflections inside the etalon will give rise to standing waves, and consequently the transmitted light intensity will vary periodically with the laser wavelength. Here, the laser wavelength is scanned. As a result, the optical transmission will follow a periodical pattern, the phase of which will depend on the total etalon length. This etalon fringe pattern may obscure the absorption signal of interest from the sample and thus affect the accuracy of the spectrometer. If the etalon length is changed by exactly $\Delta L = m \cdot \lambda / 4$, where m is an odd number, the etalon fringe pattern at the laser wavelength $\lambda$ will be reversed. Thus, by changing the etalon length back and forth, the unwanted periodic fringe pattern can be averaged out thereby yielding a flat optical transmission.

To vary the optical length of the passive cavity, the position of one of the optical elements, e.g., the laser 1 or the lens 5, is vibrationally varied along the laser beam direction with a, e.g., triangular, back-and-forth movement (x).

For that purpose, the laser 1 is arranged on a cantilever body 9 which is, at one end 10, attached to a base 11 by a flexural pivot 12 and, at the other free end 13, coupled to an electromagnetic actuator 14. The laser 1 is arranged at a position between the ends 10 and 13 of the cantilever body 9, where the moment of inertia of the laser 1 around the pivot is at least substantially equal to that of the cantilever body 9. The electromagnetic actuator 14 is of a moving magnet type and comprises a magnet 15 attached to the cantilever body 9 and a drive coil 16 attached to a support block 17. Further, a vibration sensor 18 is attached to the cantilever body 9 for providing an actual vibration value 19. The vibration sensor 18 is also of a moving magnet type, and comprises a further magnet 20 attached to the cantilever body 9 and a sense coil 21 attached to the support block 17.

The control unit 7 generates, synchronously with the laser modulation signal 6, a triangular vibrator driver signal 22 which is fed to a control device 23 for controlling the vibration movement (x) of the cantilever body 9. The control device 23 includes the vibration sensor 18, a controller 24 and a driver 25 for the actuator 14.

Figure 2:
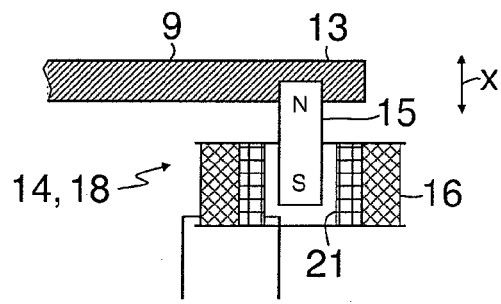
FIG. 2 is a detailed schematic block diagram of an alternative embodiment of the apparatus.

As shown in FIG. 2, the vibration sensor 18 may comprise a sense coil interacting with the magnet 15 of the electromagnetic actuator 14. Thus, the drive and sense coils 16, 21 and the magnet 15 are combined into one unit, where both coils 16, 21 may be wound on the same bobbin.

Figure 3:
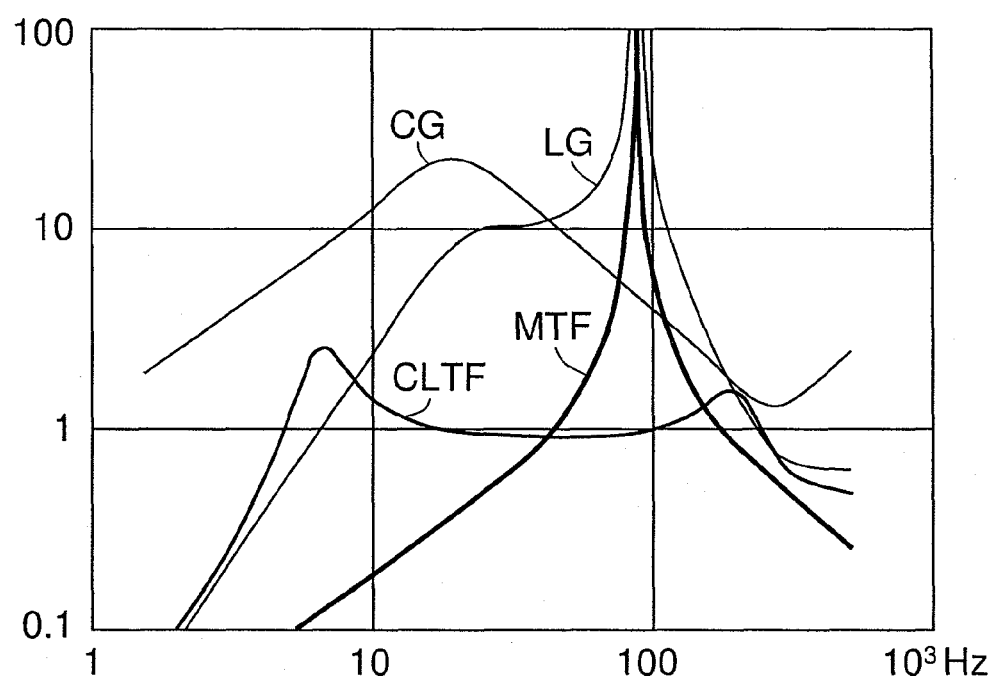
FIG. 3 is a graphical plot of a transfer function diagram.

FIG. 3 provides an example of how the bandwidth of the mechanical resonance, i.e., the mechanical transfer function (MTF), is increased from a few Hz to more than 100 Hz (i.e., a closed loop transfer function (CLTF)) with the control loop. The Controller Gain (CG) and the MTF combine to form the Loop Gain (LG) and the mechanical resonance is included inside the control loop. The CG drops off at lower frequencies below the nominal movement frequency to make the controller design easier.

The apparatus in accordance with the invention advantageously permits adaptation of the mechanical dimensions around a flexure to easily achieve low fatigue loads that allow long life continuous operation where a typical application must achieve 10 Giga-cycles with high reliability. In addition, the disclosed embodiments of the mechanical arrangement are adaptable to different optical requirements and mass loads. Moreover, in comparison to piezo and moving coil actuators, the mechanical system provided by the disclosed embodiments of the apparatus is mechanically robust and compact. Reasonable variations in the mechanical parameters of the flexure are eliminated by the control system. Consequently, the cost of the system is decreased, while reliability and robustness are increased. Moreover, the disclosed embodiments of apparatus can be manufactured from easily available standard parts from several different sources, where a low cost configuration is provided. The actuator is configured for any suitable drive voltage, and requires a low level of drive power.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. An apparatus for reducing fringe interference of light created in an optical system of a laser spectroscopy system, the apparatus comprising:
    an electromagnetic actuator configured to generate, along a laser path, a physical translational vibration of an optical element of the optical system;
    a control device configured to control an amplitude and frequency of the physical translational vibration; and
    a cantilever body which is, at one end, attached to a base by a flexural pivot and at, another free end, coupled to the electromagnetic actuator, the optical element being arranged on the cantilever body;
    wherein the control device includes a controller which controls the amplitude of the physical translational vibration and a vibration sensor attached to the cantilever body which provides an actual vibration value to the controller; and
    wherein the optical element is arranged at a position between ends of the cantilever body at which a moment of inertia of the optical component around a pivot point is at least substantially equal to a moment of inertia of the cantilever body.

2. The apparatus of claim 1, wherein the electromagnetic actuator is a moving magnet actuator having a magnet attached to the cantilever body and a drive coil attached to a support block.

3. The apparatus of claim 2, wherein the vibration sensor comprises a sense coil interacting with the magnet.

4. The apparatus of claim 2, wherein the vibration sensor comprises a moving magnet sensor having a further magnet attached to the cantilever body and a further sense coil attached to one of the support block and another support block.

* * * * *